United States Patent
Mattes et al.

(10) Patent No.: US 7,272,480 B2
(45) Date of Patent: Sep. 18, 2007

(54) METHOD FOR RECOGNISING A COLLISION BY MEANS OF AN UPFRONT SENSOR SYSTEM AND DEVICE FOR CARRYING OUT SAID METHOD

(75) Inventors: Bernhard Mattes, Sachsenheim (DE);
Siegfried Malicki, Ingersheim (DE);
Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/561,566

(22) PCT Filed: Jun. 26, 2004

(86) PCT No.: PCT/DE2004/001351

§ 371 (c)(1),
(2), (4) Date: May 31, 2006

(87) PCT Pub. No.: WO2005/001488

PCT Pub. Date: Jan. 6, 2005

(65) Prior Publication Data

US 2006/0224288 A1    Oct. 5, 2006

(30) Foreign Application Priority Data

Jun. 27, 2003   (DE) .............................. 103 28 948

(51) Int. Cl.
*B60R 22/00* (2006.01)
*E05F 15/00* (2006.01)

(52) U.S. Cl. .................. 701/45; 701/46; 180/268; 180/271; 180/282; 340/438; 340/439; 342/72; 280/735

(58) Field of Classification Search ............ 701/45–47, 701/300, 301; 180/268, 271, 273, 282; 340/435, 340/436, 438, 439; 342/72; 280/735
See application file for complete search history.

(56) References Cited

U.S. PATENT DOCUMENTS

| | | | |
|---|---|---|---|
| 6,026,340 A * | 2/2000 | Corrado et al. | 701/47 |
| 6,272,411 B1 * | 8/2001 | Corrado et al. | 701/45 |
| 6,650,983 B1 * | 11/2003 | Rao et al. | 701/45 |
| 2004/0019420 A1 * | 1/2004 | Rao et al. | 701/45 |

FOREIGN PATENT DOCUMENTS

| | | |
|---|---|---|
| DE | 195 37 546 | 4/1997 |
| DE | 196 09 290 | 12/2002 |
| EP | 0 980 323 | 8/2001 |
| WO | 89 11986 | 12/1989 |
| WO | 90 03289 | 4/1990 |
| WO | 02 053419 | 7/2002 |
| WO | 02 068246 | 9/2002 |

* cited by examiner

*Primary Examiner*—Gertrude A. Jeanglaude
(74) *Attorney, Agent, or Firm*—Kenyon & Kenyon LLP

(57) ABSTRACT

An apparatus for detecting impact of a moving object, in particular of a vehicle, having a first sensor device for acquiring an acceleration in a direction of motion of the moving object, an evaluation device for evaluating the first acceleration signal, and at least one second sensor device for acquiring an acceleration in an acquisition direction that is different from the direction of motion of the moving object, a classification of an impact by way of a classification signal being made available as a function of accelerations in at least two directions of motion or three acceleration directions.

22 Claims, 2 Drawing Sheets

METHOD FOR RECOGNISING A COLLISION BY MEANS OF AN UPFRONT SENSOR SYSTEM AND DEVICE FOR CARRYING OUT SAID METHOD

FIELD OF THE INVENTION

The present invention concerns an apparatus and a method for the up-front sensor suite, and concerns in particular an apparatus and a method for detecting impact of a moving object after an impact, in particular of a vehicle, acceleration signals that have been captured in different acquisition axes being employed for impact classification.

BACKGROUND INFORMATION

Outlying sensors are used for detecting impact in restraint systems in the automotive industry. German Patent No. 196 09 290, for example, describes the use for frontal impact sensing of so-called outlying up-front sensors (UFS), which are located in the deformation zone so that in the early impact phase (crash phase), the intensity or severity of a crash can be detected by sensing the penetration behavior of a barrier into the crumple zone of the vehicle.

One significant problem in terms of detection and classification of an impact is the fact that the up-front sensors themselves are deflected during the impact out of the detection position or acquisition direction provided for them, so that as a result of a change in acquisition direction, a corresponding acquisition accuracy is also reduced.

To solve the problem, it has been proposed to employ sensors disposed in a fusion concept for triggering decisions. Disadvantageously, however, all the up-front sensors are disposed so that they sense in the vehicle's longitudinal axis (the X direction). Up-front sensors of this kind are usually mounted on the radiator crossmember or at similar installation locations.

It is thus a substantial disadvantage of existing apparatuses for impact sensing that, an acceleration sensor disposed in the vehicle's longitudinal axis experiences a change in direction in the event of a vehicle impact, so that a measurement inaccuracy with regard to the acquired acceleration value can occur.

A deflection of the sensor in this fashion causes a greater or lesser portion of important information to lost. This results in the further disadvantage that only a reduced sensor information state can be made available to a downstream triggering algorithm for a connected restraint system.

The mode of operation of the downstream restraint system is thus based on an incorrect sensor information state, which can disadvantageously result in improper function of the entire impact protection system.

SUMMARY OF THE INVENTION

The apparatus according to the present invention for detecting impact, and the method according to the present invention, have the advantage, as compared with the known approach to achieving the object, that a reliable classification of the impact is possible even if an acquisition direction of the sensor device that serves for acceleration acquisition is modified during an impact.

One essential concept of the invention consists in combining acceleration signals of different sensor devices, which are sensitive in different acquisition directions, with one another in such a way that in the event of a change in an acquisition direction of a sensor, the acceleration signals of further sensors can be employed to correct the sensor signal, modified by the modified acquisition direction, of the first sensor. The advantage thus exists that a first acceleration signal made available by a first sensor device can be corrected by way of further sensor devices that supply further acceleration signals, in order to obtain a corrected first acceleration signal with which a reliable classification signal for detecting impact can be made available.

A further advantage of the present invention is therefore that even if an up-front sensor sensing in the vehicle's longitudinal direction deflects out of its defined sensing direction during the impact, a reduced information state in the triggering algorithm does not result in a delayed triggering, or in fact complete suppression of triggering, of restraint means or restraint systems of a vehicle.

Advantageously, an evaluation unit detects the reduced information state so that the algorithm can recover the complete information by sensor data fusion.

By way of the sensor assemblage according to the present invention having additional acquisition axes, the situation of a reduced information state can advantageously be recognized and a fallback level can be switched to, in which context a triggering behavior without information from an up-front sensor suite can be determined.

It is additionally advantageous that a sensor signal measured in the X direction that is distorted in its magnitude by the deflection is correctable by way of signals measured in other acquisition axes (Y and Z directions), in which context the corrected signal can ultimately be evaluated in the usual way by a triggering algorithm of a restraint system.

It is additionally advantageous that the sensor device according to the present invention can be used for the detection of specific impact types or crash types or similar situations.

It is thus useful that a reliable basis for generating a triggering decision is made available.

It should be noted that the expression "impact of a moving object" refers to a change in the motion of the vehicle as a result of the impact, since the vehicle need not itself have been moving before the impact, i.e. it may have been struck by another impact object while stationary, or two (moving) objects may have impacted one another.

According to a further preferred development of the present invention, the first and/or at least one second sensor device is embodied as an acceleration sensor.

According to a further preferred development of the present invention, the evaluation device has a rotation sensing unit for determining a rotation of the moving object and for outputting a rotation signal as a function of the rotation.

Advantageously, a deflection of an up-front sensor out of an original acquisition direction, or a rotation of the acquisition direction, can thereby also be sensed. According to yet another preferred development of the present invention, the evaluation device has a first impact strength determination unit for determining an impact strength in the acquisition direction that is coincident with the direction of motion of the moving object, and for outputting a first impact strength signal.

According to yet another preferred development of the present invention, the evaluation device has a second impact strength determination unit for determining an impact strength in an acquisition direction that is in the direction of motion of the moving object, and for outputting a second impact strength signal.

According to yet another preferred development of the present invention, the first and second sensor devices are made available as a single two-dimensional acceleration acquisition unit.

Advantageously, the first and second sensor devices are integrated into an acceleration acquisition module.

According to yet another preferred development of the present invention, the first and second sensor devices are made available as a single three-dimensional acceleration acquisition unit, the advantage being that the first and at least two second sensor devices can be integrated into a single acceleration acquisition module.

According to yet another preferred development of the present invention, the first and second sensor devices have acquisition axes that are perpendicular to one another. According to yet another preferred development of the present invention, the acceleration acquisition modules are embodied in duplicate, and are disposed on the moving object with a lateral spacing from one another.

According to yet another preferred development of the present invention, the evaluation device has a calculation unit for calculating the classification signal as a function of the rotation signal that is outputted by the rotation sensing unit and the first and second impact strength signals that are outputted by the first and second impact strength determination units.

According to yet another preferred development of the present invention, the evaluation device has a correction unit for correcting, by way of the at least one second acceleration signal that is outputted by the at least one second sensor device, the first acceleration signal that is outputted by the first sensor device, and for outputting a corrected first acceleration signal.

According to yet another preferred development of the present invention, two- or three-dimensional acceleration acquisition is made available by way of the first and second sensor devices.

According to yet another preferred development of the present invention, the first acceleration signal is corrected by way of the at least one second acceleration signal in the correction unit that is included in the evaluation device, a corrected first acceleration signal being outputted from the correction unit.

According to yet another preferred development of the present invention, the rotation of a moving object is determined, in the rotation sensing unit that is included in the evaluation device, in such a way that the acceleration signals of the individual acquisition directions are accumulated, i.e. geometrically added up.

According to yet another preferred development of the present invention, switchover to a fallback level occurs if an acceleration acquired by the at least one second sensor device in an acquisition direction that is different from the direction of motion of the moving object exceeds a predetermined proportion of the acceleration acquired by the first sensor device in an acquisition direction that is coincident with the direction of motion of the moving object.

DETAILED DESCRIPTION

Figure 1:
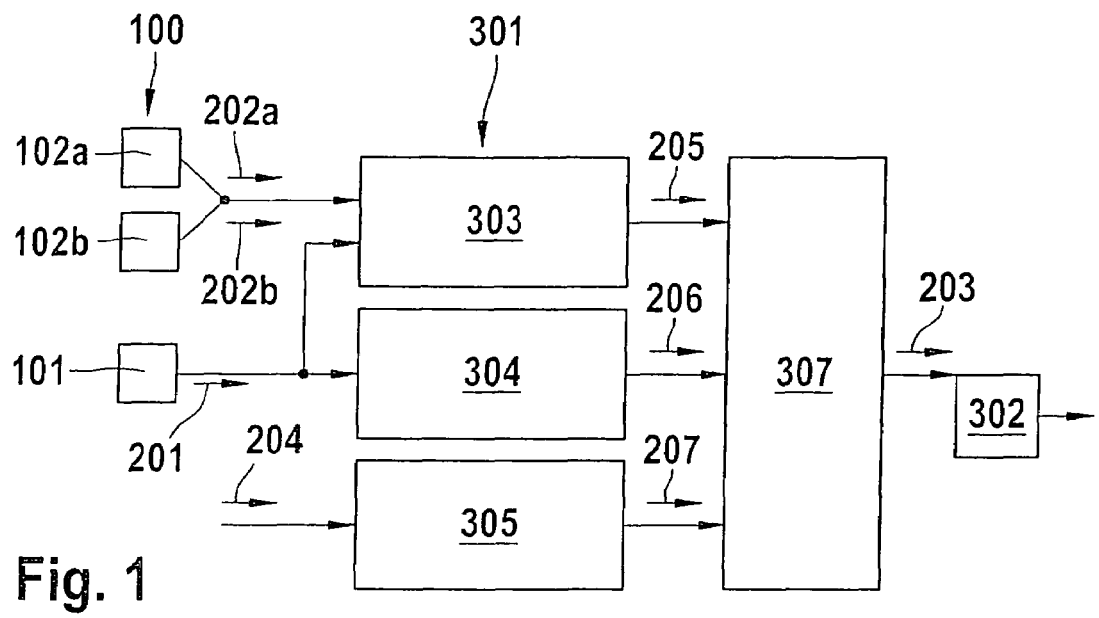
FIG. 1 shows a block diagram to illustrate a method for detecting an impact of a moving object, according to a preferred exemplifying embodiment of the present invention.

In the Figures, identical reference characters designate identical or functionally identical components or steps.

The block diagram shown in FIG. 1 illustrates a method for detecting an impact of a moving object 100, in particular of a vehicle, according to a preferred exemplary embodiment of the present invention.

An evaluation device 301 according to the present apparatus encompasses, as essential components, a rotation sensing unit 303, a first impact strength determination unit 304, a second impact strength determination unit 305, a calculation unit 307, and an output device 302. The two second acceleration signals 202a and 203a are delivered to rotation sensing unit 303. Also delivered to the rotation sensing unit and to the first impact strength determination unit are the signals of first sensor device 101, in particular first acceleration signal 201.

A central acceleration signal 204 is delivered to second impact strength determination unit 305 from a central sensor device (not shown).

In first impact strength determination unit 304, a first impact strength signal 206 is determined from first acceleration signal 201 of first sensor device 101 by the fact that the signal of first sensor device 101 in an acquisition direction that is coincident with a direction of motion X (see below with reference to FIGS. 3 and 4) of moving object 100 is delivered and processed.

The derivation of acceleration signals from conventionally available sensor devices for measuring an acceleration is known to one skilled in the art.

Whereas first sensor device 101 outputs a first acceleration signal 201 as a function of an acceleration in the X direction (=direction of the vehicle's longitudinal axis), second sensor devices 102a and 102b are disposed so that they have an acquisition direction Y (=vehicle's transverse axis) and Z (=direction of the vehicle's vertical axis) that are different from direction X of moving object 100.

In rotation sensing unit 303, a rotation of the sensor (and in general also of moving object 100) about the Y axis is sensed by the fact that sensor signals in, for example, the X direction and Z direction are vectorially added according to the equation $$X_{\mathit{eff}} = (X^2_{meas} + Z^2_{meas})^{1/2},$$

and a rotation about the Z axis according to the following equation:

$$X_{\mathit{eff}} = (X^2_{meas} + Y^2_{meas})^{1/2}.$$

The geometrical relationships in the context of a rotation of the sensor about the Y axis will be described below with reference to FIG. 3, while a rotation about the Z axis will be described below with reference to FIG. 4. Acceleration signals that were obtained from different acquisition directions or sensing directions are thus delivered to rotation sensing unit 303.

Rotation signal 205 outputted by rotation sensing unit 303 is then analyzed in calculation unit 307. In the calculation unit, a predetermination can be made as to when the system switches over to a fallback level. This fallback level can be, for example, the level made available when a defect is ascertained in an up-front sensor.

The calculation unit thus makes available an operating mode in which switchover to a fallback level occurs when an acceleration acquired by the at least one second sensor device 102a, 102b in an acquisition direction Y, Z that is different from longitudinal axis X of moving object 100 exceeds a predetermined proportion of the acceleration acquired by first sensor device 101 in an acquisition direction that is coincident with longitudinal axis X of the moving object. In order to perform this calculation, the output signals of first and second impact strength determination units 304 and 305 are additionally delivered to calculation unit 307.

The output signal of first impact strength determination unit 304 is delivered to calculation unit 307 as a first impact strength signal 206 which reflects an impact strength in the X direction of motion of moving object 100, i.e. in acquisition direction X. This first impact strength signal 206 is thus dependent on first acceleration signal 201 outputted by first sensor device 101.

Also made available is a central impact sensing system (sensor device not shown) that centrally acquires an impact strength, a second impact strength signal 207 being outputted from second impact strength determination unit 305. As a result of the signals delivered to calculation unit 307, i.e. the delivery of rotation signal 205, first impact strength signal 206, and second impact strength signal 207, sufficient information is then present to make available, in the context of an appropriate placement of first and second sensor devices 101, 102a, and 102b, two- and/or three-dimensional acquisitions of the acceleration direction.

It is thus furthermore possible to sense an impact strength in directionally dependent fashion. This furthermore makes it advantageously possible to avoid a reduced information state, which can result in delayed triggering or in fact complete suppression of a triggering of restraint systems.

The rotation detection or calculation system can be embodied, for example, in such a way that directed or absolute signal components that are acquired in the individual spatial directions are accumulated, so that acceleration signals 201, 202a, 202b of the individual acquisition directions X, Y, and Z are vectorially summed.

This makes it possible to employ the acceleration signals known from the additional acquisition directions in order to make available the following procedures:
(i) Detection of a reduced information state and switchover to a fallback level, i.e. a level that is also used in the event of a defect in an up-front sensor, so that the triggering behavior can be determined without the information of the up-front sensor suite;
(ii) Correction, by way of the measured signals from the Y/Z directions, of an acceleration signal measured in the X direction that is falsified in its magnitude by the deflection; and delivery of the corrected signal to calculation unit 307; and
(iii) Determination and detection of impact types or crash types so that, advantageously, a triggering decision can continue to be generated.

An accumulation as described above makes it possible to determine whether a sensor device has rotated beyond a permissible amount out of a defined acquisition direction, for example the X direction of motion.

In calculation unit 307 it is thus possible to detect the exact situation of an impact on the basis of acceleration signals in multiple spatial directions. Advantageously, three sensor devices 101, 102a, 102b, whose respective acquisition axes X, Y and Z are perpendicular to one another, are employed. A three-dimensional acquisition of the acceleration vector during a vehicle impact thus becomes possible. This three-dimensional acquisition of the acceleration vector provides the basis for indicating an impact type or crash type.

The impact type can thus be determined on the basis of the direction and magnitude of the acceleration signal. This impact type is outputted from calculation unit 307 in the form of a classification signal 203 and delivered to output device 302. The classification signal outputted from output device 302 then serves further control purposes, for example for precise triggering of a restraint system of a vehicle.

Figure 2:
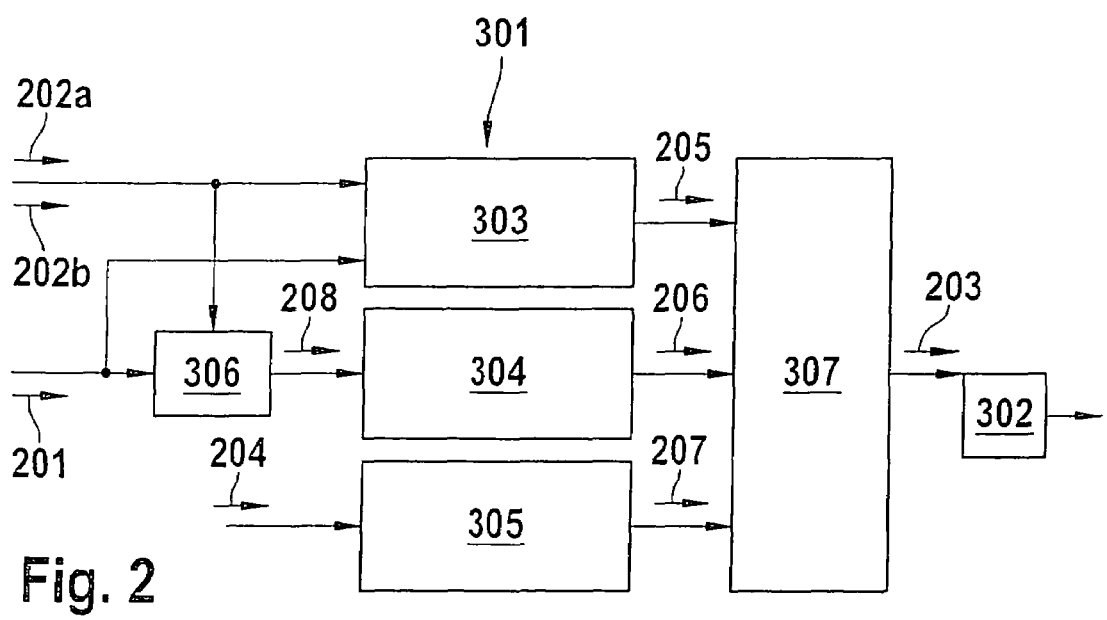
FIG. 2 shows a block diagram of a further method for detecting an impact of a moving object, according to a further preferred exemplifying embodiment of the present invention.

FIG. 2 additionally shows a correction unit 306, contained in evaluation device 301, which is capable of outputting a corrected first acceleration signal 208. The remaining components and signals correspond to those shown in FIG. 1 and are not explained in more detail here in order to avoid an overlapping description.

As shown in FIG. 2, both first acceleration signal 201 that is made available by first sensor device 101, and at least one second acceleration signal 201a, 201b that is made available by the at least one second sensor device 102a, 102b, are delivered to correction unit 306.

Acquisition of an acceleration in a direction that is different from the acquisition direction of first sensor device 101 thus makes it possible to correct first acceleration signal 201 made available by first sensor device 101.

The correction in the context of a rotation of the sensor about the Y axis (see FIG. 3) is described by the following equation:

$$X_{\mathit{eff}} = (X^2_{\mathit{meas}} + Z^2_{\mathit{meas}})^{1/2},$$

whereas a rotation about a Z axis (FIG. 4) is described by the following equation:

$$X_{\mathit{eff}} = (X^2_{\mathit{meas}} + Y^2_{\mathit{meas}})^{1/2}.$$

It is thus possible to determine an effective magnitude, designated in the above equations as $X_{\mathit{eff}}$, of the acceleration signal of the first sensor device, which as a rule is implemented as an up-front sensor, from the measured accelerations $X_{\mathit{meas}}$ in the X direction and $Z_{\mathit{meas}}$ in the Z direction or $Y_{\mathit{meas}}$ in the Y direction.

Figure 3:
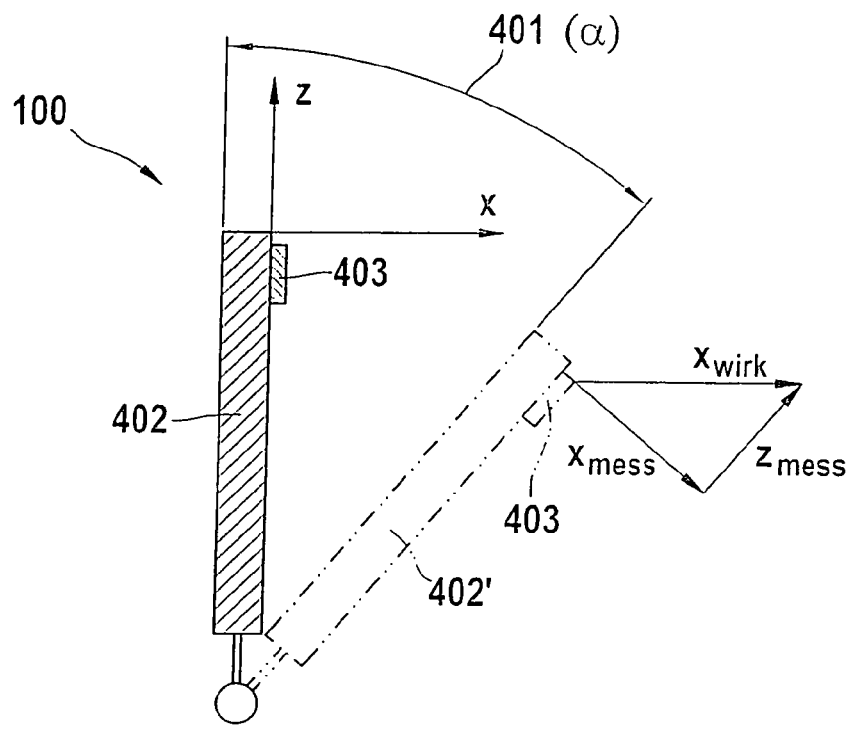
FIG. 3 shows, by way of example, a deflection of an up-front sensor system about a Y axis and a corresponding measured value correction.

FIG. 3 illustrates an example of a method, executable in correction unit 306, for correcting a rotation about the Y axis, which in this exemplifying embodiment of the present invention corresponds to a vehicle's transverse axis. A rotation of the sensor about the Y axis is brought about, for example, by a deflection of the mounting system of the up-front sensor when driving under a semi-trailer. First deflection angle [alpha], designated by a reference character 401, can assume a variety of values:
α≈0: continuous high barrier, such as a solid wall;
α>0: elevated barrier, e.g. driving under a semi-trailer; and
α<0: low barrier, for example a sports car, etc.

It is assumed in this context that up-front sensor 403 is mounted on a rigid retaining element 402 that, in the context of an impact, rotates out of the X direction through an angle [alpha] 401.

Directions of action $X_{meas}$, $Z_{meas}$ that yield the effective acceleration $X_{eff}$ in X direction are also indicated in FIG. 3.

Figure 4:
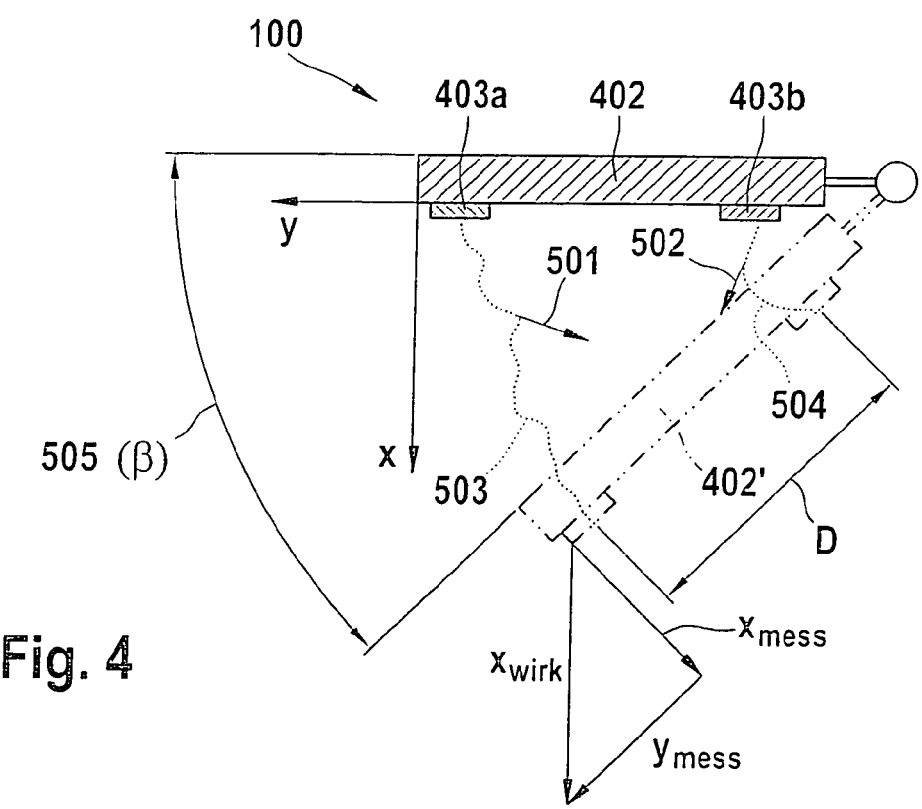
FIG. 4 shows, by way of example, a deflection of an up-front sensor system about a Z axis and sensor paths for sensor devices, embodied in duplicate, that are mounted on a moving object with a lateral spacing.

Lastly, FIG. 4 shows an assemblage in which a first up-front sensor 403a and a second up-front sensor 403b are disposed on a common retaining element 402. The example shown in FIG. 4 depicts the case of a rotation by the moving object (vehicle) about the vertical axis (Z direction).

Variables that can advantageously be used in a triggering algorithm as described above are also derived. The two up-front sensors 403a and 403b travel different distances in the context of the indicated deflection through a second deflection angle β 505, which distances can be calculated using the equations below. For first up-front sensor 403a, for example, the following applies:

$$\bar{s}_1 = \int \bar{u}_1(t)dt \quad (1),$$

whereas the distance traveled by second up-front sensor 403b is described by the following equation:

$$\bar{s}_2 = \int \bar{u}_2(t)dt \quad (2)$$

In the above equations (1) and (2), variables $u_1$ and $u_2$ are calculated using the following equation:

$$\bar{u}_i = \bar{a}_{ix} + \bar{a}_{iy} + \bar{a}_{iz},$$

where the index i=1, 2.

The total motion distance traveled by the vehicle in the context of a deceleration or an impact is given by the following equation:

$$\bar{s}_{ECU} = \int u_{ECU} dt,$$

from which the relative penetrations can be calculated.

What therefore results is a value $s_{1x} - s_{ECU}$ for a relative penetration from the left front and $s_{2x} - s_{ECU}$ for a relative penetration from the right front, whereas $s_{1y} - s_{2y}$ is obtained for a relative penetration from the left side, and $s_{2y} - s_{1y}$ for a relative penetration from the right side.

The apparatus according to the present invention for detecting impact makes possible a timely switchover to a fallback level if a proportion of $Y_{meas}$ with respect to $X_{meas}$ exceeds a predetermined value.

Use of the relative penetration (or angle β, i.e. second deflection angle 505) makes possible an impact classification, in terms of detecting an offset crash by way of a relative penetration front |left-right|>>0, detecting 100% overlap by way of a relative penetration |left-right|≈0, and detecting an angle by way of a relative penetration side |left-right|>>0.

The apparatus and the method according to the present invention thus make it possible reliably to detect crash types and to control a triggering mechanism of a restraint system in accordance with the detected crash types.

In the example shown in FIG. 4 of a rotation about the Z axis, the two up-front sensors 403a, 403b travel different distances, from which angle β, i.e. second deflection angle 505, can be determined. This requires that the lateral sensor spacing D at which first and second up-front sensors 403a and 403b are mounted on retaining element 402 be known.

The dashed lines in FIG. 4 designate the respective sensor paths 503 and 504 traveled by the corresponding up-front sensors, i.e. first up-front sensor 403a travels first sensor distance 501, while second up-front sensor 403b travels second sensor distance 502.

The overall sensor path for the two up-front sensors is depicted by the dashed line in FIG. 4, i.e. a first sensor path 503 relevant to first up-front sensor 403a, and a second sensor path 504 relevant to second up-front sensor 403b.

It is thus possible to carry out a reliable impact type detection even if, during an impact, retaining element 402 rotates out of its originally provided location, for example, about the Z axis into the location depicted at reference character 402'.

Although the present invention has been described above with reference to preferred exemplifying embodiments, it is not limited thereto but rather is modifiable in numerous ways.

The invention is also not limited to the potential applications cited.

What is claimed is:

1. An apparatus for detecting an impact of a moving object, in particular of a vehicle, comprising:
    a first sensor device for acquiring an acceleration in an acquisition direction that is coincident with a direction of motion of the moving object, and for outputting a first acceleration signal dependent on the acceleration;
    an evaluation device for evaluating the first acceleration signal in such a way that a classification of the impact is made available by a classification signal;
    an output device for outputting the classification signal to an external control device; and
    at least one second sensor device for acquiring an acceleration in an acquisition direction that is different from the direction of motion of the moving object, and for outputting at least one second acceleration signal dependent on the acceleration, wherein:
    the at least one second acceleration signal depends on the acceleration being employed for evaluation, in the evaluation device, for evaluating the first acceleration signal, in such a way that a classification of the impact by way of the classification signal as a function of accelerations in at least two directions of motion is made available.

2. The apparatus as recited in claim 1, wherein the first sensor device includes an acceleration sensor.

3. The apparatus as recited in claim 1, wherein the evaluation device includes a rotation sensing unit for determining a rotation of the moving object and for outputting a rotation signal dependent on the rotation.

4. The apparatus as recited in claim 1, wherein:
    the evaluation device includes a first impact strength determination unit for determining an impact strength in the acquisition direction that is coincident with the direction of motion of the moving object, and
    the first impact strength determination unit outputs a first impact strength signal.

5. The apparatus as recited in claim 4, wherein:
    the evaluation device includes a second impact strength determination unit for determining the impact strength in the acquisition direction that is in the direction of motion of the moving object, and
    the second impact strength determination unit outputs a second impact strength signal.

6. The apparatus as recited in claim 1, wherein the at least one second sensor device includes an acceleration sensor.

7. The apparatus as recited in claim 1, wherein the first sensor device and the at least one second sensor device are part of a single two-dimensional acceleration acquisition unit.

8. The apparatus as recited in claim 1, wherein the first sensor device and the at least one second sensor device are part of a single three-dimensional acceleration acquisition unit.

9. The apparatus as recited in claim 1, wherein the first sensor device and the at least one second sensor device have acquisition axes that are perpendicular to one another.

10. The apparatus as recited in claim 1, wherein the first sensor device is embodied in duplicate, and the duplicates are disposed on the moving object with a lateral spacing from one another.

11. The apparatus as recited in claim 1, wherein the evaluation device includes a calculation unit for calculating the classification signal as a function of the rotation signal and a plurality of impact strength signals.

12. The apparatus as recited in claim 1, wherein:
the evaluation device includes a correction unit for correcting the first acceleration signal by way of the at least one second acceleration signal, and
the correction unit outputs a corrected first acceleration signal.

13. A method for detecting an impact of a moving object, comprising:
acquiring a first acceleration in an acquisition direction that is coincident with a direction of motion of the moving object using a first sensor device;
outputting from the first sensor device a first acceleration signal dependent on the acceleration;
evaluating the first acceleration signal in an evaluation device, in such a way that a classification of an impact is made available by way of a classification signal;
outputting the classification signal to an external control device by way of an output device;
acquiring a second acceleration in an acquisition direction that is different from the direction of motion of the moving object by way of at least one second sensor device; and
outputting the second acceleration as at least one second acceleration signal dependent on the second acceleration, wherein:
the at least one second acceleration signal dependent on the second acceleration is employed for evaluation, in the evaluation device for evaluating the first acceleration signal, in such a way that the classification of the impact by way of the classification signal as a function of the first acceleration and the second acceleration in one of two directions of motion and three directions of motion is made available.

14. The apparatus as recited in claim 1, wherein the moving object includes a vehicle.

15. The method as recited in claim 13, further comprising:
determining a rotation of the moving object in a rotation sensing unit that is included in the evaluation device; and
outputting a rotation signal dependent on the rotation of the moving object from the rotation sensing unit.

16. The method as recited in claim 13, further comprising:
determining an impact strength in the acquisition direction that is coincident with the direction of motion of the moving object by way of a first impact strength determination unit that is included in the evaluation device; and
outputting a first impact strength signal from the first impact strength determination unit.

17. The method as recited in claim 16, further comprising:
determining a second impact strength in the acquisition direction that is in the direction of motion of the moving object by way of a second impact strength determination unit that is included in the evaluation device; and
outputting a second impact strength signal from the second impact strength determination unit.

18. The method as recited in claim 15, further comprising:
calculating the classification signal in a calculation unit that is included in the evaluation device, as a function of the rotation signal and a plurality of impact strength signals.

19. The method as recited in claim 13, further comprising:
correcting the first acceleration signal by way of the at least one second acceleration signal in a correction unit that is included in the evaluation device; and
outputting a corrected first acceleration signal from the correction unit.

20. The method as recited in claim 15, wherein the rotation of the moving object is determined, in the rotation sensing unit that is included in the evaluation unit, in such a way that the first acceleration signal and the at least one second acceleration signal of individual acquisition directions are accumulated.

21. The method as recited in claim 15, wherein:
a switchover to a fallback level occurs if the second acceleration acquired by the at least one second sensor device in an acquisition direction that is different from the direction of motion of the moving object exceeds a predetermined proportion of the first acceleration acquired by the first sensor device in an acquisition direction that is coincident with the direction of motion of the moving object.

22. The method as recited in claim 13, wherein the moving object includes a vehicle.

* * * * *